(12) United States Patent
Bloebaum et al.

(10) Patent No.: US 6,204,808 B1
(45) Date of Patent: Mar. 20, 2001

(54) METHOD AND SYSTEM FOR AIDING GPS RECEIVERS VIA A CELLULAR OR PCS NETWORK

(75) Inventors: Leland Scott Bloebaum; Havish Koorapaty; Daniel P. Homiller, all of Cary, NC (US); Bagher R. Zadeh, Dallas, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/264,120

(22) Filed: Mar. 8, 1999

Related U.S. Application Data
(60) Provisional application No. 60/096,437, filed on Aug. 13, 1998.

(51) Int. Cl.[7] .............................. H04B 7/185; G01S 5/02
(52) U.S. Cl. .............................. 342/357.07; 342/357.09; 342/357.1; 342/457; 701/213
(58) Field of Search ........................ 342/357.07, 357.09, 342/357.1, 457; 701/213

(56) References Cited

U.S. PATENT DOCUMENTS

| | | |
|---|---|---|
| 4,445,118 | 4/1984 | Taylor et al. . |
| 5,418,538 | 5/1995 | Lau . |
| 5,420,592 | * 5/1995 | Johnson . |
| 5,663,734 | 9/1997 | Krasner . |
| 5,663,735 | 9/1997 | Eshenbach . |
| 5,841,396 | 11/1998 | Krasner . |
| 5,983,161 | * 11/1999 | Lemelson et al. .................... 701/301 |

FOREIGN PATENT DOCUMENTS

| | | |
|---|---|---|
| 2 321 883 | 8/1998 | (GB) . |
| WO 98/25157 | 6/1998 | (WO) . |

* cited by examiner

Primary Examiner—Theodore M. Blum
(74) Attorney, Agent, or Firm—Wood, Phillips, VanSanten, Clark & Mortimer

(57) ABSTRACT

In accordance with the invention, there is disclosed a system for determining location of a mobile station. The mobile station includes a transceiver operating in a wireless network and a GPS receiver. The system includes a wireless network control system including GPS receivers for obtaining ephemeris data. The control system develops assistance information from the ephemeris data and transmits the assistance information to the mobile station via the wireless network. The assistance information represents range at a fixed location in the wireless network in proximity to the mobile station at a select time, and derivatives of the range, relative to plural select satellites in the GPS. The mobile station utilizes received assistance information for searching the composite received signals from the plural select satellites in the GPS to measure a code phase for plural ones of the select satellites in the GPS and returning the measured code phases to the wireless network control system via the wireless network. The wireless network control system computes location of the mobile station in the wireless network utilizing a fixed location and the measured code phases.

39 Claims, 5 Drawing Sheets

METHOD AND SYSTEM FOR AIDING GPS RECEIVERS VIA A CELLULAR OR PCS NETWORK

This invention claims the benefit of U.S. Provisional Application No. 60/096,437, filed Aug. 13, 1998.

FIELD OF THE INVENTION

This invention relates to Global Positioning System (GPS) receivers and, more particularly, to a method to deliver information to GPS receivers that are integrated with cellular phones or other devices that communicate via a cellular or PCS network.

BACKGROUND OF THE INVENTION

Determining the geographical position of a mobile station within a cellular network or other Public Land Mobile Network (PLMN) has recently become important for a wide range of applications. For example, positioning services may be desired by transport and taxi companies to determine the location of their vehicles and to improve the efficiency of dispatch procedures. In addition, for emergency calls, e.g., 911 calls, knowing the exact location of a mobile terminal may be vital in ensuring a positive outcome in emergency situations.

Furthermore, positioning services can be used to determine the location of a stolen car, to identify home zone calls which may be charged at a lower rate, to detect hot spots in a micro cell, or to provide premium subscriber services, e.g., the Where Am I service. The Where Am I service facilitates the determination of, for example, the location of the nearest gas station, restaurant, or hospital to a mobile station.

One technique for determining the geographic position of a mobile station is to use the satellite-based Global Positioning System (GPS). GPS is a satellite navigation system that provides specially coded satellite signals that can be processed in a GPS receiver to yield the position, velocity and time of a receiving unit. Four or more GPS satellite signals are needed to compute the three-dimensional locational coordinates and the time offset of a receiver clock relative to a fixed coordinate system.

The GPS system comprises twenty-four satellites (not counting spares) that orbit the Earth in approximately twelve hours. The orbital altitude of the GPS satellites (20,200 Km) is such that the satellites repeat the same ground track and configuration over any point approximately once every twenty-four hours. There are six orbital planes each nominally with at least four satellites in each, that are equally spaced (i.e., 60° apart) and inclined at about 55° relative to the equatorial plane of the Earth. This constellation arrangement ensures that between four and twelve satellites are visible to users from any point on Earth.

The satellites of the GPS system offer two levels of precision in determining the position, velocity and time coordinates at a GPS receiver. The bulk of the civilian users of the GPS system use the Standard Positioning Service (SPS) which has a 2-σ accuracy of 100 meters horizontally, ±156 meters vertically and ±340 ns time. The Precise Positioning Service (PPS) is available only to authorized users having cryptographic equipment and keys and specially equipped receivers.

Each of the GPS satellites transmit two microwave carrier signals. The L1 frequency (centered at 1575.42 MHZ) carries the navigation message as well as the SPS and PPS code signals. The L2 frequency (centered at 1227.60 MHZ) also carries the PPS code and is used to measure the ionospheric delay by receivers compatible with the PPS system.

The L1 and L2 microwave carrier signals are modulated by three binary codes: a 1.023 MHZ Coarse Acquisition (C/A) code, a 10.23 MHZ Precise Code (P-Code) and a 50 Hz Navigational System Data Code (NAV Code). The C/A code is a pseudorandom number (PRN) code that uniquely characterizes a GPS satellite. All of the GPS satellites transmit their binary codes over the same L1 and L2 carriers. The multiple simultaneously-received signals are recovered by a Code Division Multiple Access (CDMA) correlator. The correlator in a civilian GPS receiver first recovers the C/A Code as modulated by the NAV Code. A Phase Locked Loop (PLL) circuit then separates out the C/A Code from the NAV Code. It should be emphasized that a GPS receiver first needs to determine its approximate location in order to determine which of the GPS satellites are within range. Conversely, a GPS receiver that knows its approximate position can tune faster into the signals transmitted by the appropriate GPS satellites.

The startup of a GPS receiver typically requires the acquisition of a set of navigational parameters from the navigational data signals of four or more GPS satellites. This process of initializing a GPS receiver may often take several minutes.

The duration of the GPS positioning process is directly dependent upon how much information a GPS receiver has. Most GPS receivers are programmed with almanac data, which coarsely describes the expected satellite positions for up to one year ahead. However, if the GPS receiver does not have some knowledge of its own approximate location, then the GPS receiver cannot correlate signals from the visible satellites fast enough, and therefore, cannot calculate its position quickly. Furthermore, it should be noted that a higher signal strength is needed for capturing the C/A Code and the NAV Code at start-up than is needed for continued monitoring of an already-acquired signal. It should also be noted that the process of monitoring the GPS signal is significantly affected by environmental factors. Thus, a GPS signal which may be easily acquired in the open becomes progressively harder to acquire when a receiver is under foliage, in a vehicle, or worst of all, in a building.

Recent governmental mandates, e.g., the response time requirements of the FCC Phase II E-911 service, make it imperative that the position of a mobile handset be determined accurately and in an expedited manner. Thus, in order to implement a GPS receiver effectively within a mobile terminal while also meeting the demands for fast and accurate positioning, it has become necessary to be able to quickly provide mobile terminals with accurate assistance data, e.g., local time and position estimates, satellite ephemeris and clock information (which may vary with the location of the mobile station). The use of such assistance data can permit a GPS receiver that is integrated with or connected to a mobile station to expedite the completion of its start-up procedures. It is therefore desirable to be able to send the necessary assistance GPS information over an existing wireless network to a GPS receiver that is integrated with or connected to a mobile terminal.

Taylor et al. U.S. Pat. No. 4,445,118 discusses the concept of aiding or assisting GPS receivers. The method described uses a single transmitter, such as a geosynchronous satellite, to provide a single assistance message for a wide geographical area. The assistance data includes a list of GPS satellites in view, the respective satellite positions, and predicted Doppler shifts on the satellite signals. This structure of this message permits the position computation function (PCF) to be done in the user receiver.

Krasner U.S. Pat. No. 5,663,734 describes another GPS receiver approach. The patent is mainly related to the receiver architecture, but discusses how the receiver performance can be improved by assistance. The patent mentions "data representative of ephemeris" and expected Doppler shifts as possible contents of the assistance message.

Lau U.S. Pat. No. 5,418,538 describes a system and method for aiding a remote GPS/GLONASS receiver by broadcasting "differential" information from a like receiver in a "reference station". The reference station broadcasts a visible satellite list and also the associated ephemerides, in one embodiment. The advantage to the remote receiver is three-fold: reduced memory requirements, lower-cost frequency reference, and faster acquisition. The discussion describes the benefit of being able to estimate and remove the Doppler due to the receiver clock inaccuracy after acquiring the first satellite.

Eshenbach U.S. Pat. No. 5,663,735 describes a method whereby a GPS receiver derives an accurate absolute time reference from a radio signal. Optionally, the receiver also derives from the radio signal a frequency reference that is more accurate than the inexpensive crystal oscillator contained in the receiver. The GPS receiver performs the position calculation, and therefore must have the absolute time as well as the ephemeris and clock corrections for the GPS satellites.

In general, the above patents do not exploit the synchronization between a user terminal and the network via an air interface. Another common drawback of the referenced prior art is that the assistance is not very compact and must be updated relatively often, which may preclude an efficient broadcast delivery in a cellular network or other PLMN.

Another Assisted-GPS proposal for GSM-based networks is T1 standards documents T1P1/98-132r2. This proposal is based on placing reference GPS receivers at various nodes in the network, capturing the ephemeris information from these receivers, then providing this information along with a list of visible satellites to all handset-based GPS receivers via messages on GSM downlink bearers. The benefit of this approach is that it allows the handset-based GPS receiver to be fully functional, i.e., it contains the PCF and also can operate in continuous navigation mode. However, the current GSM network architecture may not be able to support the amount of data transmission required by this method. It is very desirable to broadcast the assistance to all GPS-equipped handsets, but it is unlikely that the broadcast facility can deliver the assistance in a timely manner. Point-to-point delivery may be feasible in the future, but current bearers Unstructured Supplementary Data (USSD) do not have the necessary bandwidth. Latency is particularly important for emergency location (E911), which is a regulatory requirement in the U.S. market.

The present invention is directed to solving one or more of the problems discussed above in a novel and simple manner.

SUMMARY OF THE INVENTION

In accordance with the invention there is provided a method of determining location of a mobile station including a transceiver operating in a wireless network and a Global Positioning System (GPS) receiver.

Broadly, there is disclosed herein the method of assisting a GPS receiver to make positioning measurements, the GPS receiver being integrated in the mobile station including a transceiver operating in a wireless network. The method comprises the steps of transferring assistance information from the wireless network to the mobile station, the assistance information representing range of a fixed location in the wireless network in proximity to the mobile station at a select time, and derivatives of the range, relative to plural select satellites in the GPS, and operating the mobile station to utilize received assistance information to search composite received signals from the plural select satellites in the GPS to measure a code phase for plural ones of the select satellites in the GPS, the measured code phases representing range of the mobile station relative to the plural ones of the select satellites.

It is a feature of the invention that the select time is contained in the assistance information and is expressed to the mobile station in terms of a wireless network time.

In one aspect of the invention the wireless network utilizes time-division multiple access methods and the select time is represented by a frame number, timeslot number, and bit number of network transmissions serving an area that is geographically proximate to the mobile station. The timeslot number, the bit number, or both, are implicitly known by both the wireless network and the mobile station, and therefore are not transmitted.

In accordance with another aspect of the invention, the wireless network utilizes a code-division multiple access method and the select time is represented by phase of a multiple access code of transmissions serving an area that is geographically proximate to the mobile station.

It is another feature of the invention that the GPS satellites transmit navigation messages with twenty millisecond bit periods and the transferring step includes the step of representing range as a bit phase observed at the fixed location at the select time. The select time is coincidental with a twenty millisecond epoch of GPS time.

It is another feature of the invention that the transferring step comprises the step of calculating the assistance information, and quantizing and encoding the assistance information to be transferred via the wireless network to the mobile station.

It is still another feature of the invention that the mobile station is operated to utilize the assistance information to compute estimates of code phase and frequency offset of signals transmitted by the select satellites, and for each of the satellites uses these estimates to acquire the signal and measure a code phase for the particular satellite.

In accordance with another aspect of the invention, there is disclosed the method of determining location of a mobile station including a transceiver operating in a wireless network and a GPS receiver. The method comprises the steps of transferring assistance information from the wireless network to the mobile station, the assistance information representing range of a fixed location in the wireless network in proximity to the mobile station at a select time, and derivatives of the range, relative to plural select satellites in the GPS, operating the mobile station to utilize received assistance information to search composite received signals from the plural select satellites in the GPS to measure a code phase for plural ones of the select satellites in the GPS, and returning the measured code phases to the wireless network, and computing location of the mobile station in the wireless network utilizing the fixed location and the measured code phases.

It is a feature of the invention that the mobile station determines a measurement time represesenting when the code phase is measured for one of the select satellites and the measurement time is returned to the wireless network. The measurement time is represented relative to time of the wireless network, and the location-computing step comprises transforming the measurement time to an absolute GPS time.

It is a further feature of the invention that the wireless network comprises a mobile location center (MLC), and the MLC communicates with the mobile station via a base transceiver system (BTS) at the fixed location, and the computing step is performed at the MLC. The MLC includes a GPS receiver, or the means to receive necessary information from a GPS receiver that is not co-located, and the transferring step comprises the MLC obtaining ephemeris information and computing the assistance information from the ephemeris information. In one embodiment, the BTS also includes a GPS receiver to provide an accurate time reference to relate time in the wireless network to GPS absolute time.

It is still another feature of the invention that the wireless network includes a time measuring unit (TMU), at a known location, having a GPS receiver and a wireless transceiver monitoring the BTS, and the transferring step comprises transferring a time reference from the TMU to the MLC to relate time in the wireless network to GPS absolute time.

In accordance with yet another aspect of the invention, there is disclosed a system for determining location of a mobile station. The mobile station includes a transceiver operating in a wireless network and a GPS receiver. The system includes a wireless network control system including GPS receivers for obtaining ephemeris data. The control system develops assistance information from the ephemeris data and transmits the assistance information to the mobile station via the wireless network. The assistance information represents range at a fixed location in the wireless network in proximity to the mobile station at a select time, and derivatives of the range, relative to plural select satellites in the GPS. The mobile station includes means utilizing received assistance information for searching the composite received signals from the plural select satellites in the GPS to measure a code phase for plural ones of the select satellites in the GPS and returning the measured code phases to the wireless network control system via the wireless network. The wireless network control system includes means for computing location of the mobile station in the wireless network utilizing a fixed location and the measured code phases.

One of the most important tasks of a GPS receiver is making the range measurements to the various satellite transmitters. In the case of civilian-grade GPS, the receiver measures the range by observing phase of the C/A code, which is unique to each satellite. Typically, the receiver must search through the entire 1023-chip period of each satellite until it acquires one. This task is made more difficult if the receiver does not have a very accurate frequency reference and if the signal has been degraded by environmental attenuation and/or design choices. These cases require either more receiver resources or that the acquisition and measurement process is lengthened. Neither option is preferred, since the former adds extra cost and the latter adds positioning latency that may not be acceptable for some location services, such as E-911.

In accordance with the invention, the receiver is provided with "assistance" so that both alternatives can be avoided. In particular, a system and method is disclosed for providing assistance information for GPS receivers that are integrated with transceivers that are capable of communicating with a cellular or PCS network.

In accordance with the invention, improved sensitivity of the integrated GPS receivers allows them to operate in environments where conventional, stand-alone GPS receivers will not. Reduced overall time is required to locate the user. This is done by reducing both the latency in transmitting the assistance information to the user and the measurement time of the user receiver in the mobile station.

Providing a very compact representation of the assistance information reduces the bandwidth required to distribute the information to various network nodes and increases the frequency at which the information can be broadcast to the mobile stations. The choice of parameters for the assistance message reduces the frequency at which the message must be updated. The user receiver in the mobile station does not need to know absolute time, since all measurements are made relative to the timing of the cellular transmission. The overall positioning solution is very flexible and places very minimal requirements on the network and its resources.

Further features and advantages of the invention will be readily apparent from the specification and from the drawings.

DETAILED DESCRIPTION OF THE INVENTION

Figure 1:
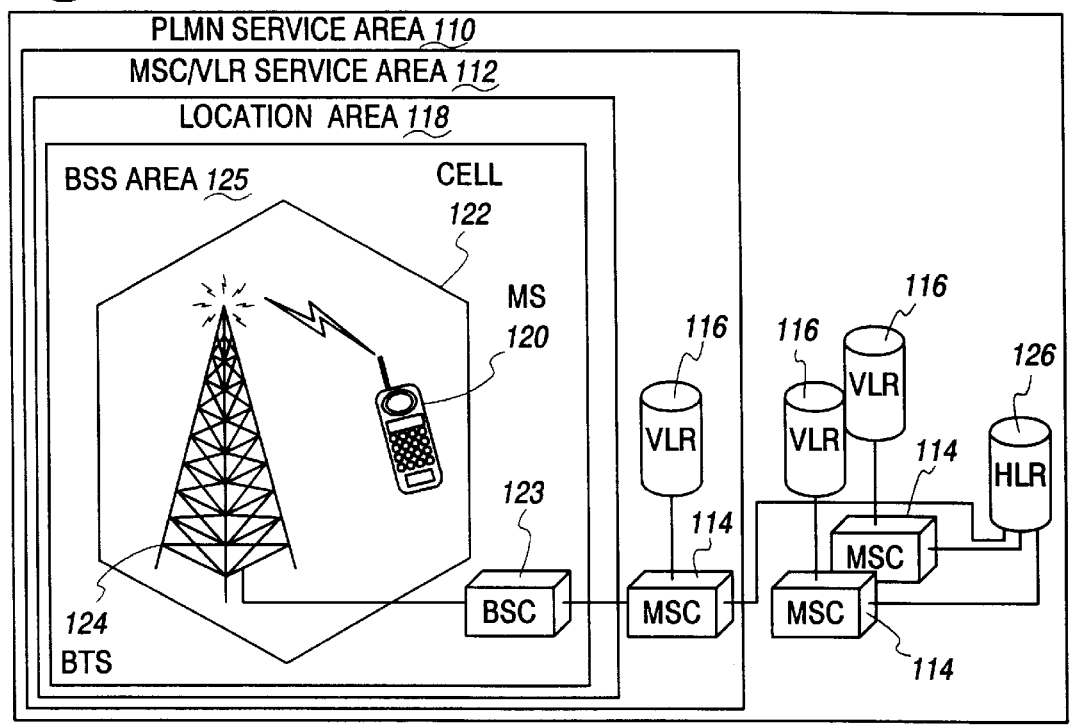
FIG. 1 is a block diagram of a conventional terrestrially-based wireless telecommunications system.

FIG. 1 illustrates a Public Land Mobile Network (PLMN), such as the exemplary GSM cellular network 110, which in turn comprises a plurality of MSC/VLR Service Areas 112, each with a Mobile Switching Center (MSC) 114 and an associated Visitor Location Register (VLR) 116. The MSC/VLR Service Areas 112, in turn, include a plurality of Location Areas (Las) 118, which are defined as that part of a given MSC/VLR Service Area 112 in which a mobile terminal or a mobile station (MS) 120 may move freely without having to update its location to the MSC 114 and/or VLR 116 that controls the LA 118. Each Location Area 118 is further divided into a number of cells 122. The exemplary Mobile Station 120 is the physical equipment, e.g., a car phone or other portable telephone, that is used by a mobile subscriber to communicate with the cellular network 110, with other mobile subscribers, or with other parties outside the subscriber network, whether wireline or wireless.

The MSC 114 is in communication with at least one Base Station Controller (BSC) 123, which, in turn, is in contact with at least one Base Transceiver Station (BTS) 124. The BTS 124 is the physical equipment, illustrated for simplicity as a radio tower in FIG. 1, that provides radio coverage to the cell 122 for which it is responsible. It should be understood that the various BSCs 123 may be connected to several BTSs 124, and may be implemented as stand-alone nodes or integrated with the MSC 114. In either event, the BSC 123 and BTS 124 components, as a whole, are generally referred to as a Base Station System (BSS) 125.

With further reference to FIG. 1, each PLMN Service Area or cellular network 110 includes a Home Location Register (HLR) 126, which is a database containing subscriber information, e.g., user profiles, current location information, International Mobile Subscriber Identity (IMSI) number, and other administrative information, for subscribers who are registered within the PLMN 110. The HLR 126 may be co-located with a specific MSC 114, integrated with MSC 114, or (as illustrated in FIG. 1) service multiple MSCs 114.

The VLR 116 is a database containing information about the plenary set of MSs 120 that are located within an MSC/VLR Service Area 112. If an MS 120 moves into a new physical location such as a new MSC/VLR Service Area 112 (not shown in FIG. 1), the VLR 116 associated with the MSC 114 requests information about the MS 120 from the HLR 126 (while simultaneously informing the HLR 126 about the new location of the MS 120). Accordingly, when the user of the MS 120 wants to make a call, the local VLR 116 will have the requisite subscriber identification information without having to reinterrogate the HLR 126.

The basic GSM access scheme is Time Division Multiple Access (TDMA) with eight basic physical channels per carrier. The carrier separation is 200 KHz. A physical channel is therefore defined as a sequence of TDMA frames as additionally specified by a time slot number and a frequency hopping sequence. The basic radio resource is a time slot that lasts 15/26 ms (i.e., 576.9 $\mu$s) and which transmits information at a modulation rate of approximately 270.83 Kbits/s. This means that the duration of each time slot (including the guard time) is 156.25 bits. Eight time slots constitute a TDMA frame. Thus, a TDMA frame has a duration of 4.615 ms (60/13 ms).

Figure 6:
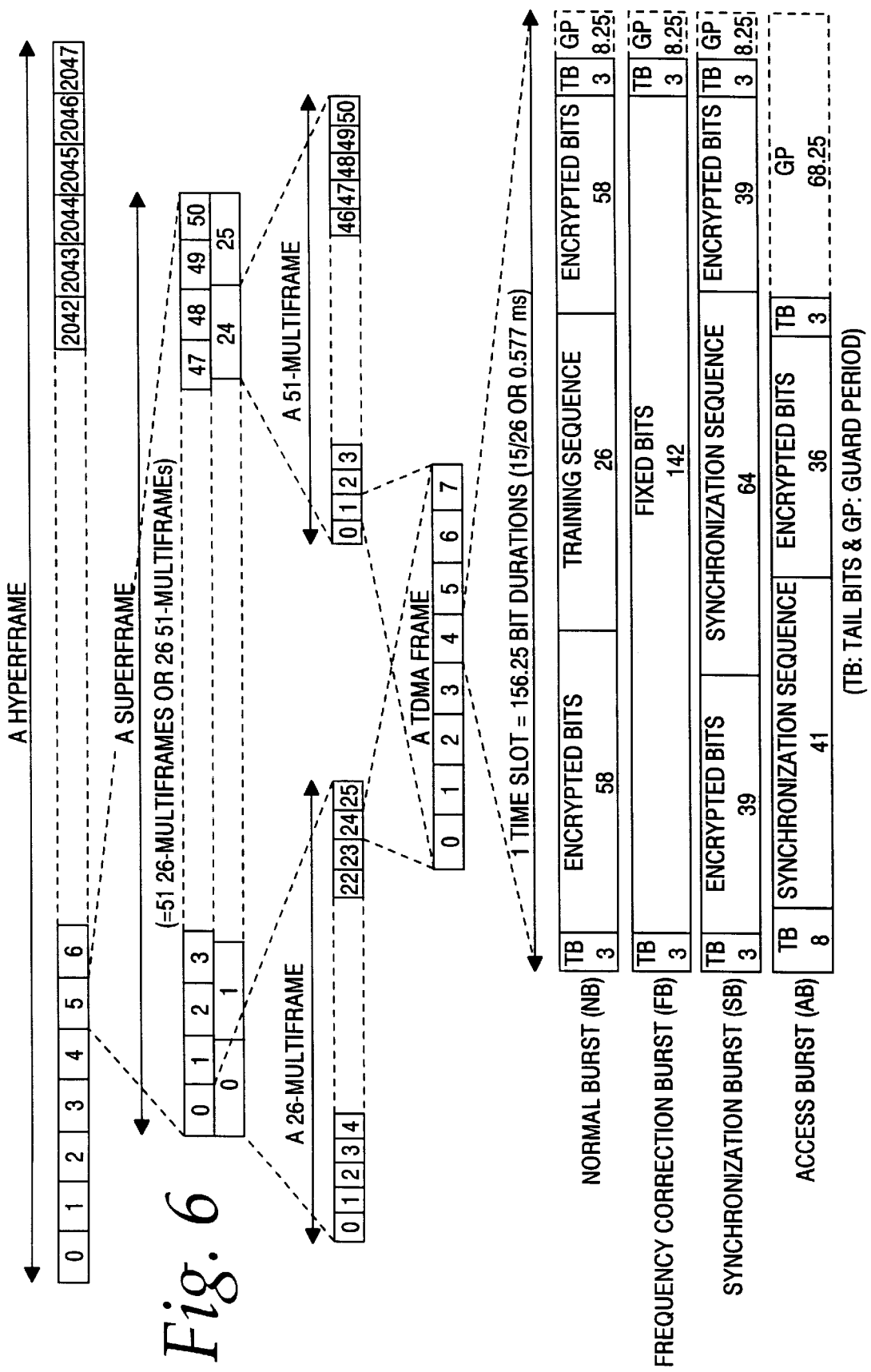
FIG. 6 is a diagrammatic representation of the GSM TDMA timeframe structures.

A diagrammatic representation of the GSM TDMA timeframe structures is depicted in FIG. 6. The longest recurrent time period of the structure is called a hyperframe and has a duration of 3 h, 38 m 53 s and 760 ms. GSM TDMA frames are numbered by a Frame Number (FN). The Frame Number (FN) is a cyclic count of successive TDMA frames that runs the range from 0 to 2,715,647 (i.e., 2048×51×26−1, also known as FN_MAX). The Frame Number is incremented at the end of each TDMA frame. The complete cycle of TDMA frame numbers from 0 to 2,715,647 is referred to as a hyperframe. This long period is needed to support certain cryptographic mechanisms defined by the ETSI GSM specification.

A GSM TDMA hyperframe is divided into 2,048 superframes each of which has a duration of 6.12 s. The superframe is the least common multiple of the GSM TDMA time frame structures. The superframe itself is further divided into three kinds of multiframes: 26-multiframes, 51-multiframes and 52-multiframes.

The first kind of the GSM TDMA multiframes is the 26-multiframe which comprises 26 TDMA frames having a total duration of 120 ms. Consequently, a GSM TDMA superframe can have 51 such 26-multiframes. These 26-multiframes are used to carry Traffic Channels (TCH) and associated control channels (including Slow Associated Control Channels (SACCH) and Full-rate Associated Control Channels (FACCH)).

The second type of GSM TDMA multiframe is a 51-multiframe, comprising 51 TDMA frames and having a total duration of 235.4 ms. A GSM TDMA superframe can have 26 such 51-multiframes. These 51-multiframes are used to support broadcast, common control and stand alone dedicated control (and their associated control channels), including, e.g., Broadcast Control Channel (BCCH), Common Control Channel (CCCH) & Stand-alone Dedicated Control Channels (SDCCH) or Packet Broadcast Control Channel (PBCCH) & Packet Common Control Channel (PCCCH).

The third type of GSM TDMA multiframe is a 52-multiframe comprising 52 TDMA frames and having a total duration of 240 ms. A GSM TDMA Superframe can have 25.5 such 52-multiframes. The TDMA frames in a 52-multiframe are numbered from 0 to 51. The 52-multiframe format is used to support packet data traffic and control channels, e.g., Packet Broadcast Control Channel (PBCCH), Packet Common Control Channel (PCCCH), Packet Associated Control Channel (PACCH) & Packet Data Traffic Channel (PDTCH).

As noted earlier, a TDMA frame is made up of eight time slots and has a duration of 4.615 ms (60/13 ms). Each time slot is a time interval of approximately 576.9 $\mu$s (15/26 ms), i.e., 156.25 bit durations, and its physical content is called a burst. As shown in FIG. 6, four different types of bursts are used in the GSM TDMA system.

The first type of burst is the so-called Normal Burst (NB), which contains 116 encrypted bits and includes a guard time of 8.25 bit durations (approximately 30.46 $\mu$s). Normal bursts are used to carry information on traffic and control channels, except for the Random Access Channel (RACH).

The second type of burst is the so-called Frequency Correction Burst (FB), which contains 142 fixed bits and includes a guard time of 8.25 bit durations (approximately 30.46 $\mu$s). Frequency Correction Bursts are used for frequency synchronization of mobile terminals. FBs are equivalent to an unmodulated carrier, that is shifted in frequency, but having the same guard time as the normal burst. FBs are broadcast together with the BCCH. The repetition of FBs is also referred to as the frequency correction channel (FCCH).

The third type of burst is the so-called Synchronization Burst (SB), which contains 78 encrypted bits and a guard period of 8.25 bits. Synchronization Bursts contain a 64-bit long training sequence and carry the information about the TDMA frame number (FN) as well as the Base Station Identity Code (BSIC). SBs are used for time synchronization of a mobile terminal and are broadcast together with the frequency correction burst (FB). The repetition of SBs is also referred to as the synchronization channel (SCH).

The fourth type of burst is the so-called Access Burst (AB). Access Bursts are used for random access and are characterized by a longer guard period (68.25 bit durations or 252 $\mu$s) to cater for burst transmissions from mobile terminals which may know the timing advance at the time of first access (or following a handover). This longer guard period allows for a mobile station to be up to 35 km from a base station transceiver. In exceptional cases the design may be compatible with cases where the cell radii is larger than 35 Km. ABs are used in the (Packet) Random Access Channel (PRACH), after a handover, on the uplink of a channel used for a voice group call in order to request the use of that uplink, as well as on the uplink of the Packet Traffic Control Channel (PTCCH) to allow estimation of the timing advance for a mobile station in a packet transfer mode.

Figure 1A:
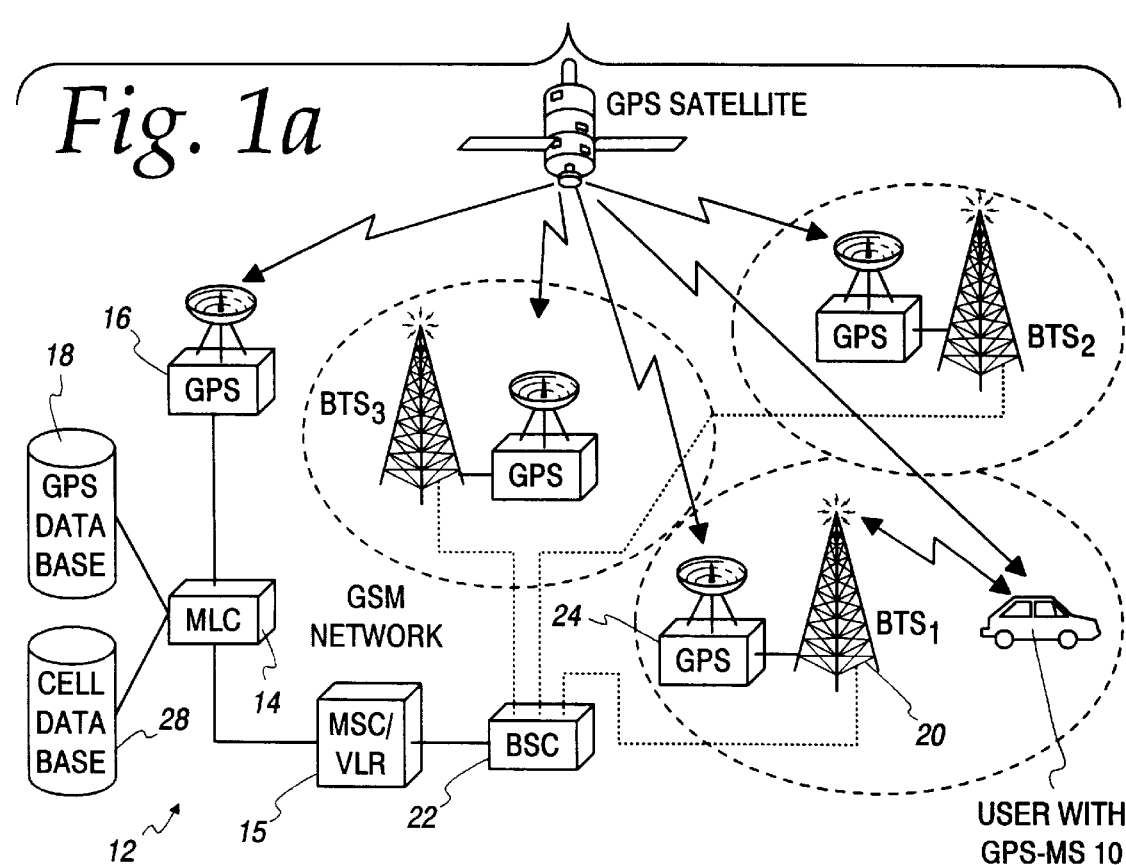
FIGS. 1a and 1b are block diagrams of a system for aiding GPS receivers in accordance with the invention.

A block diagram of a cellular network utilizing assisted-GPS positioning is shown in FIG. 1a. This particular example is based on the GSM standard, as above, but those skilled in the art will recognize that the approach can be used in other standards. A user device 10 is a mobile station fully capable of communicating with a GSM network 12 over the standard air interface, and includes a GPS receiver that can acquire and measure the signals from the GPS satellites. This device 10 is referred to as a GPS-MS.

Figure 5:
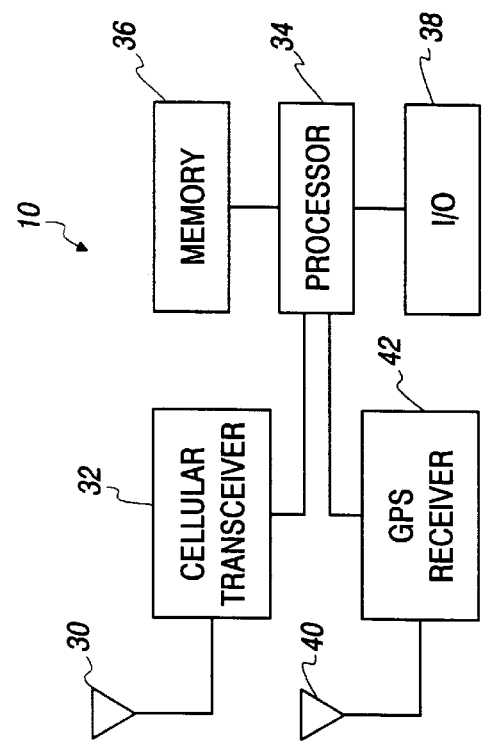
FIG. 5 is a generalized block diagram of a mobile station according to the invention.

Referring to FIG. 5, a block diagram of the GPS-MS 10 is illustrated. Particularly, the GPS-MS 10 comprises a typical mobile station (also called a wireless telephone, cellular telephone, or cell phone) and includes a first antenna 30 for sending and receiving radio signals between itself and a wireless network. The antenna 30 is connected to a cellular transceiver 32 to broadcast and receive signals. As is conventional with typical mobile stations, the transceiver 32 demodulates, demultiplexes and decodes the radio signals into one or more channels. Such channels include a control channel and a traffic channel for speech or data. Messages from the control channel are delivered to a processor 34. The processor 34 controls and coordinates the functioning of the GPS-MS 10 responsive to messages on the control channel using programs and data stored in a memory 36 so that the GPS-MS 10 can operate within the wireless network. The processor 34 also controls operation of the GPS-MS 10 responsive to input from an I/O block 38 representing a user interface. The I/O 38 can include a keypad, display, lights, and special purpose buttons and the like. A second antenna 40 is utilized for receiving composite signals from Global Positioning System (GPS) satellites which are supplied to a GPS receiver 42. The GPS receiver 42 communicates information relating to these signals to the processor 34. The processor 34 is programmed, in accordance with the invention, to make GPS positioning measurements using information received from the wireless network, as described more particularly below.

Referring again to FIG. 1a, a Mobile Location Center (MLC) 14 is responsible for obtaining the GPS assistance information and translating it into the format required by the GPS-MS 10. The MLC 14 likely will receive the assistance in the form of ephemeris and clock correction data. Two possible sources for this information are shown. One source is a reference GPS receiver 16 that communicates directly with the MLC 14. This reference GPS receiver 16 acquires the visible GPS signals and demodulates the transmitted navigation messages, which contain the ephemeris and clock corrections for the respective satellites. The GPS receiver 16 also may be used as an accurate time reference, as well as a source for differential GPS (DGPS) corrections. The ephemeris also may be obtained from an external database 18, e.g., via a TCP/IP network.

In this case, the MLC 14 must obtain accurate time and DGPS information from another source. Actually, it may be advantageous for the MLC 14 to have multiple sources of GPS information to improve reliability. As shown in FIG. 1a, the MLC also has access to a cell database 28, which contains coordinates of all cell sites that are in the geographic area served by the MLC. Also shown in FIG. 1a are the standard GSM network elements that were previously described, including the MSC/VLR 15, a Base Station Controller (BSC) 22, and Base Transceiver System (BTS) 20.

Another element in the network shown in FIG. 1a is a GPS receiver 24 attached to each BTS 20. In terms of this invention, the main purpose of the GPS receiver 24 is to provide the BTS 20 with an accurate time reference such that the BTS 20 can relate air-interface timing to GPS time. As such, the configuration is commonly referred to as a "synchronized" network. Note that a synchronized network will provide other benefits (e.g., faster handoff) not directly related to this invention.

Figure 1B:
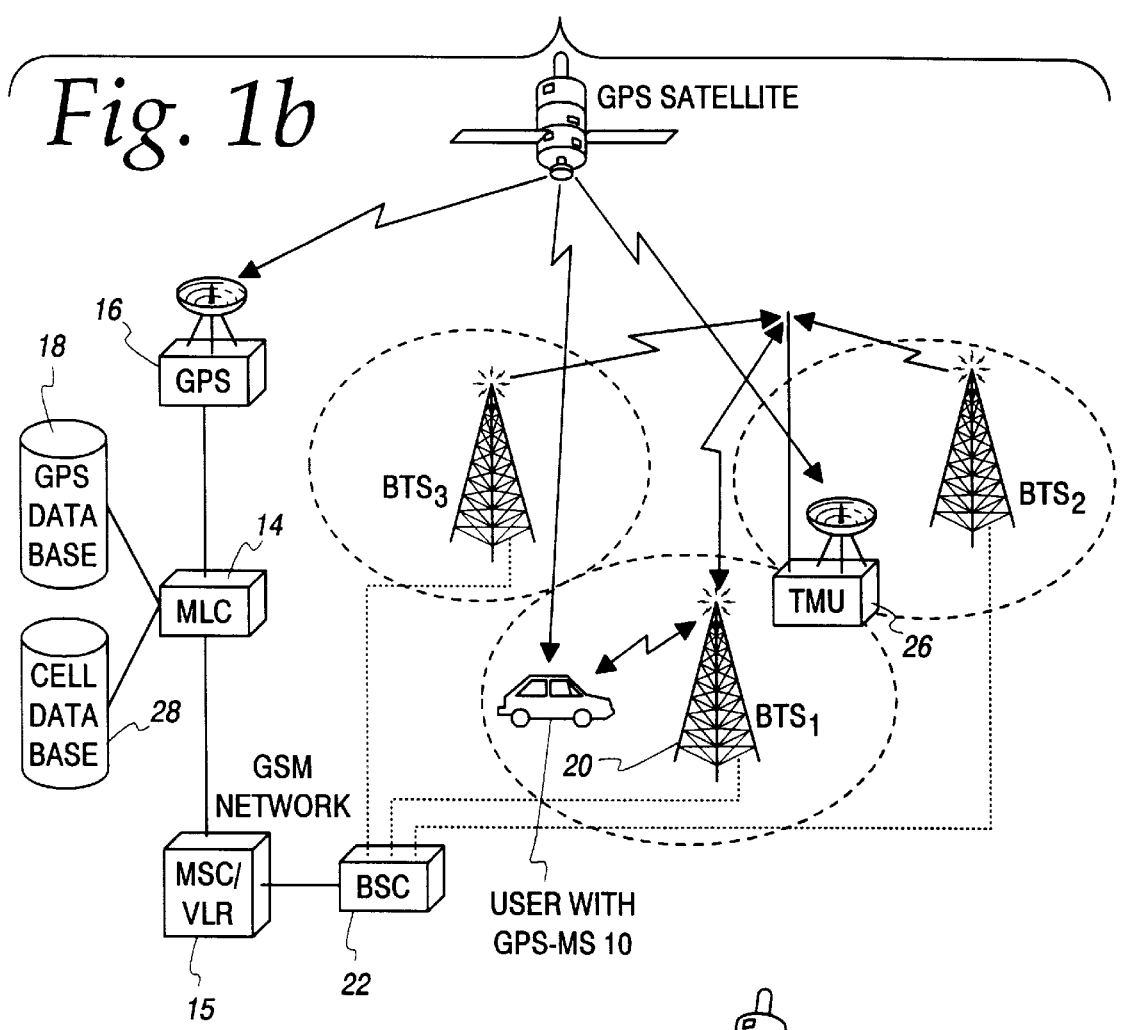

An alternate embodiment of a cellular network utilizing assisted-GPS positioning is shown in FIG. 1b. This embodiment also is based on the GSM standard, and contains standard network components described above, such as BTSs 20, BSCs 22, and MSC/VLR 15. These components function in the same manner as described above, transporting assistance and measurements between the MLC 1 and the GPS-MS 10. The main difference from the network shown in FIG. 1a is that the BTSs 20 in the network do not have GPS receivers to provide timing information, i.e., the network is unsynchronized.

Although the network is unsynchronized, the necessary timing relationships are provided by the Timing Measurement Unit (TMU) 26, which is equipped with one or more cellular receivers and a GPS receiver. Once it is placed at a known coordinate, the TMU 26 monitors the cellular transmissions from one or more BTSs that are in the geographic proximity. Events in each monitored BTS transmission are time-stamped with the corresponding GPS time from the TMU's GPS receiver. The resulting relationships are transmitted to the MLC 14 via the TMU's serving BTS, which is $BTS_1$ in the example network shown in FIG. 1b.

Figure 2:
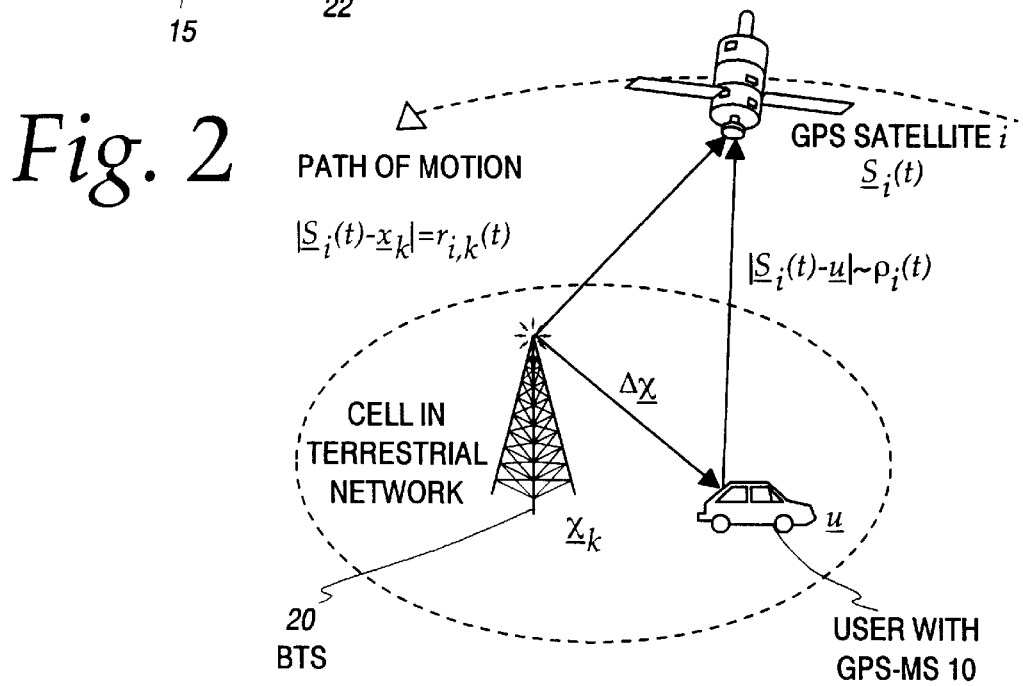
FIG. 2 is a simplified view of a satellite positioned relative to a base transceiver station and GPS-MS.

FIG. 2 shows a simplified view of a single GPS satellite i and its coordinate relationships to a particular BTS 20 at position $x_k$ and the GPS-MS 10 at position u. The range measured by the GPS-MS at time t from satellite i is given by $$r_i(t) = l_i(t) \cdot (s_i(t) - (x_k + \Delta x)) + c \cdot (b_u(t) - B_i(t)) + c \cdot (I_i(t) + T_i(t) + S_i(t)) + v_i$$

$$= (\hat{l}_i(t) - \Delta l_i(t)) \cdot ((\hat{s}_i(t) - \Delta s_i(t)) - (x_k + \Delta x)) + c \cdot (b_u(t) - (\hat{B}_i(t) - \Delta B_i(t))) + c \cdot (I_i(t) + T_i(t) + S_i(t)) + v_i, \quad (1)$$

where c is the speed of light (m/s), $B_i$ is the bias in $i^{th}$ satellite's clock (s), $b_u$ is the bias in the receiver's clock (s), $I_i$ and $T_i$ are the ionospheric and tropospheric delays (s) along the path from satellite i to the receiver, and $S_i$ is the clock bias (s) due to selective availability (SA) in the $i^{th}$ satellite. The term $v_i$ represents measurement noise (m). All hat ("^") terms indicate an estimate or prediction and the delta ("$\Delta$") terms are errors between the prediction and the actual value of the respective parameters. In the same manner, the line-of-sight unit vectors are given by $$l_i(t) = \frac{s_i(t) - (x_k + \Delta x)}{|s_i(t) - (x_k + \Delta x)|} \cdot \hat{l}_i(t) = \frac{\hat{s}_i(t) - x_k}{|\hat{s}_i(t) - x_k|} \cdot \Delta l_i = \hat{l}_i - l_i. \quad (2)$$

Although the ionospheric, tropospheric, and SA delays have significant contributions to the GPS error budget, they are dominated by other uncertainties in the assistance calculation. Likewise, the modeling error $\Delta B_i$ of the satellite clock bias is relatively small. These terms can be included in the measurement noise term, $v_i$. In addition, if the receiver and satellite distance uncertainties, respectively $\Delta x$ and $\Delta s_i$, are small relative to the range from the satellite, then $$l_i(t) \approx \frac{s_i(t) - (x_k + \Delta x)}{|\hat{s}_i(t) - x_k|} \cdot \Delta l_i \approx \frac{\Delta s_i(t) + \Delta x}{|\hat{s}_i(t) - x_k|}. \quad (3)$$

Using these assumptions, the equation for the range measurements can be re-written as $$\hat{r}_i(t) \approx \hat{l}_i(t) \cdot (\hat{s}_i(t) - x_k) - \Delta l_i(t) \cdot (\hat{s}_i(t) - x_k) - \hat{l}_i(t) \cdot (\Delta s_i(t) + \Delta x) + c \cdot (b_u(t) - \hat{B}_i(t)) + \upsilon_i$$

$$\approx \hat{l}_i(t) \cdot (\hat{s}_i(t) - x_k) - 2 \cdot \hat{l}_i(t) \cdot (\Delta s_i(t) + \Delta x) + c \cdot (b_u(t) - \hat{B}_i(t)) + \upsilon_i$$

$$\approx [|\hat{s}_i(t) - x_k| - c \cdot \hat{B}_i(t)] - 2 \cdot \hat{l}_i(t) \cdot \Delta x - 2 \cdot \hat{l}_i(t) \cdot \Delta s_i(t) + c \cdot b_u(t) + \upsilon_i$$

$$\approx r_{i,k}(t) - 2 \cdot \hat{l}_i(t) \cdot \Delta x - 2 \cdot \hat{l}_i(t) \cdot \Delta s_i(t) + c \cdot b_u(t) + \upsilon_i. \quad (4)$$

In the above equation, the first term $r_{i,k}(t)$ represents the expected range measurement to be made by a GPS receiver at $x_k$, provided that the receiver clock is perfectly synchronized with absolute GPS time. This measurement includes the bias of the $i^{th}$ satellite's clock from absolute GPS time and is commonly referred to as a "pseudorange". The second term in (4) represents ambiguity in the user position, while the third term represents the ambiguity in the satellite position.

The term $r_{i,k}(t)$ is much larger than the other terms in equation (4), and can be used by the GPS receiver to focus its acquisition process. As described below, the MLC 14 calculates this term and provides a representation of it as part of the assistance message to all GPS-MS 10 that are served by $BTS_k$. Prior to computing the assistance, the MLC 14 must have valid ephemeris and clock correction information, which may be obtained from a variety of sources as described above. The MLC 14 also must have an accurate real-time clock, which can be provided by a GPS receiver or by other sources such as WWV, which is a short-wave radio signal transmitted by the NIST agency of the U.S. Government. The MLC 14 also must have geographical coordinates of all BTSs 20 that it services, i.e., all BTSs 20 attached to served BSCs 22. The earth-centered-earth-fixed (ECEF) coordinates for the $k^{th}$ served BTS will be denoted $x_k$. This information is shown as the database 28 in FIG. 1a and FIG. 1b.

If the MLC 14 is in this state at some time $t_1$, then the MLC 14 uses the valid ephemeris to compute the positions of all GPS satellites at $t_1$. The MLC 14 then determines which are visible to $BTS_k$ and the range $r_{i,k}$ between the $i^{th}$ visible satellite at $s_i$ and $BTS_k$ at $x_k$. $BTS_k$ can provide this range term as a parameter of the assistance message for all GPS-MS 10 it serves.

However, the range $r_{i,k}$ is helpful to assist the GPS-MS 10 served by BTS 20 only at or very near time $t_1$. Due to the GPS satellite orbital velocity of approximately 3.85 km/s, the range $r_{i,k}$ changes very quickly. The actual range rate depends on several factors but typically is between ±800 m/s. It is desirable for the assistance to be valid for a long duration. e.g., 30 to 60 minutes after $t_1$, so more information is necessary. This information can be derived by applying a Taylor series expansion to $r_{i,k}(t)$ about time $t_1$, i.e., $$r_{i,k}(t_1 + \Delta t) = r_{i,k}(t_1) + \Delta t \cdot r'_{i,k}(t_1) + \quad (5)$$

$$\frac{(\Delta t)^2}{2} r''_{i,k}(t_1) + \frac{(\Delta t)^3}{6} r'''_{i,k}(t_1) + \ldots$$

$$= \sum_{n=0}^{\infty} r_{i,k}^{(n)}(t_1) \cdot \frac{(\Delta t)^n}{n!}.$$

By keeping enough derivative terms from the series, the position $r_{i,k}(t_2)$ can be described with the necessary accuracy for some time $t_1 + \Delta t$. Based on the well-known motion of the GPS satellites and a time goal of $\Delta t < 45$ minutes, sufficient accuracy can be achieved by keeping the first five terms of the series (n=0 . . . 4). Note that fewer derivatives may be used if the desired $\Delta t$ is reduced.

The range term $r_{i,k}(t_1)$ has units of meters (m) and is on the order of $2 \times 10^7$ m. t There are more efficient representations than direct encoding of the range value. For instance, civilian GPS receivers typically measure the range by observing the phase of the C/A code at the 1-ms epoch of its local clock source. The range can be specified by the code phase observation at a 1-ms epoch by an "ideal" reference receiver at $x_k$ whose local time base is GPS time (e.g., no clock bias or measurement noise). This produces an integer-millisecond ambiguity for the GPS-MS, but not for the MLC, since the GPS-MS position is known to within approximately the cell radius. Other ambiguities include the range and clock terms in equation (4).

An alternate method, which is preferred, is described as follows. The GPS satellites transmit a navigation message with 20-ms bit periods (50-Hz data rate). Depending on the range $r_{i,k}(t)$, the ideal receiver at $x_k$ sees the bit edges in the navigation message from satellite i occurring in the range of 0 to 20 ms relative to when they are transmitted. Thus, the range can be expressed as the bit phase observed by the ideal receiver at the 20-ms GPS epoch of $t_1$, such that $$\phi_{i,k}(t_1) = 20 \cdot 1023 \left(1 - \text{rem}\left(\frac{r_{i,k}(t_1)}{0.02 \cdot c}\right)\right) \quad (6)$$

where 1023 is the number of chips in 1-ms of the Gold code transmitted by satellite i. From the perspective of the GPS-MS 10, this form has an integer-bit ambiguity plus ambiguities due to location and clock bias. The result $\phi_{i,k}(t_1)$ is given in terms of chips, and has a maximum value of 20460. Note that this relationship in (6) is strictly valid only if $t_1$ is a 20-ms GPS epoch, when the actual bit and code phases of the GPS satellite transmissions are zero. If $t_1$ is not a 20-ms epoch, then the non-zero phase must be included in the calculation for $\phi_{i,k}(t_1)$.

Once the assistance terms have been calculated, they are quantized and encoded before they are provided to the served BSCs 22. Many different quantization and bit-allocation schemes can be employed, and Table 1 below gives one such example for the four-derivate assistance.

TABLE 1

| Parameter | Range | Bits | #Required |
|---|---|---|---|
| $\phi_{i,k}(t_1)$ | 0–20460 chips | 13 | N |
| $r'_{i,k}(t_1)$ | ±800 m/s | 10 | N |
| $r''_{i,k}(t_1)$ | −0.08–+0.16 m/s² | 7 | N |
| $r'''_{i,k}(t_1)$ | ±2.5 × 10⁻⁵ m/s³ | 7 | N |
| $r''''_{i,k}(t_1)$ | ±0.8 × 10⁻⁸ m/s⁴ | 3 | N |
| SatID | 0–31 | 5 | N |
| $t_1$ | 0–604800 s | 20 | 1 |
| Total bits | 20 + 45N | | |

The quantization can be based on the probability density functions (PDFs) of the individual parameters. For instance, it is expected that $\phi_{i,k}(t_1)$ will have a uniform distribution. The total number of bits depends on the number of satellites N and will range from 200 (N=4) to 560 (N=12), with 380 (N=8) being typical. The 20-bit value for $t_1$ provides sufficient accuracy if the assistance parameters are calculated for an integer-second GPS time.

For the case when the MLC 14 serves 5 BSCs 22 each serving 100 BTSs 20 and the assistance message is updated every thirty minutes, then the link between the MLC 14 and BSCs 22 must carry 380,000 bits per hour on average. If 10-second update latency is allowed, then the link must carry 19,000 bits per second during each update period.

There are several possible enhancements to this assistance-computation procedure. One anticipated drawback is that some satellites visible at $t_1$ may not be visible at or near $t_2$, thereby reducing the effective size of the list. One way to address this is for the MLC 14 to "look ahead" when computing its visible list. Assistance for satellites that become visible at $x_k$ between $t_1$ and $t_2$ can be included. In most cases, this feature increases the list by only one or two satellites. If the MLC 14 has some knowledge of the geography and/or propagation conditions local to each served BTS 20, it can use this information to construct assistance for the satellites that are most probably visible at each BTS 20. For example, very useful assistance can be created if the MLC 14 knows that a BTS 20 serves a street with a particular geographic orientation.

A necessity of any GPS-based positioning method is the time transfer to the mobile station. In a conventional GPS approach, the GPS receiver must demodulate the GPS time-of-week (TOW) information from one or more of the satellite signals it measures. A key part of the invention is that the GPS-MS 10 does not need to have an accurate reference to absolute (GPS) time. Instead, the GPS-MS 10 performs GPS-related calculations and measurements relative to time based on network events. On the other hand, the MLC 14 must have an accurate absolute time reference in order to perform an accurate position calculation based on the GPS-MS measurements. Thus, a key feature of this invention is the translations between GPS time and network-derived time, which is described below.

The level of accuracy of the time translation depends on the requirements for the particular task being performed by the GPS-MS 10 or the MLC 14. There are two main tasks in GPS-based positioning that require an accurate time reference:

1. Acquisition in the GPS-MS: As described above, the timing uncertainty in the GPS-MS 10 appears as the fourth term in equation (4). As the timing uncertainty grows, it causes the GPS-MS 10 to have to search more of the code space during the acquisition process. It is thus desirable to keep the error or uncertainty as low as possible. A timing uncertainty of 10 $\mu$s requires that the GPS-MS 10 search over 10 additional chips of the 1023-chip C/A code, in addition to the search due to location uncertainty relative to the reference location for which the assistance is provided.

2. Time-Stamp measurements: The GPS-MS 10 must time-stamp its measurements before returning them to the MLC 14 so that the MLC 14 can compute the satellite positions when the measurements were made. The velocities of the GPS satellites, approximately 3.85 km/s, mainly dictate the required timing accuracy for this operation. For example, a 1-ms timing error results in only 3.85-m errors in the GPS satellite position estimates computed by the MLC 14. Only the portion of this error along the receiver-to-satellite line-of-sight vector impacts the accuracy of the PCF. Generally, this error in the estimated range is less than 1 m. Consequently, 1-ms accuracy is sufficient for time-stamping measurements.

If the timing accuracy of the assistance information provided to GPS-MS 10 is on the order of 1 ms, then the GPS-MS 10 will be required to search the entire length of the C/A codes of one or more GPS satellites that are indicated as visible. While 1-ms timing accuracy allows the GPS-MS 10 to avoid bit-synchronization with one or more of the GPS satellite, those skilled in the art will appreciate the advantages provided by the GPS-MS 10 having timing accuracy of 10 $\mu$s or better. In the preferred embodiment of this invention, the timing assistance provided to the GPS-MS 10 has accuracy of 10 $\mu$s or better. In order for this level of accuracy to be useful to the GPS-MS 10, the errors in range prediction also must be kept relatively small. This is done by providing a sufficient number of derivatives in the assistance message, and using a sufficient number of bits for quantization and encoding of the parameters.

The main requirement for time translation is that the translating unit must have knowledge of both the absolute and derived time bases. In the case of the GSM-based system used as an example here, the BTSs 20 establish the timing of the air-interface transmissions to the served GPS-MS 10 so it has knowledge of the relative time base. There are several methods to provide a BTS 20 with knowledge of the absolute (GPS) time base. For instance, if a T1 line is used for data transmission between the BSC 22 and the BTS 20, then the T1 clock may be tied very closely to an absolute time reference. In order to achieve sufficient (e.g., 1-ms) accuracy to GPS time, some calibration procedures may be required.

Another alternative is to co-locate a GPS receiver 24 with each BTS 20 such as shown in FIG. 1a. In this case, the BTS air-interface may be synchronized to GPS time as observed by the receiver 24. This observation error is specified to be <340 ns at least 95% of the time. Most commercial GPS receivers can be programmed to output a periodic pulse (e.g., 1-Hz) along with a message indicating observed GPS time at that pulse. The BTS 20 can use these two pieces of information to establish a relative air-interface time base that has superb accuracy with the absolute GPS time base.

Still a further alternative is to utilize the TMU 26 shown in FIG. 1b. The BTS air-interface is synchronized to GPS time as observed by the TMU 26.

For the network topology shown in FIG. 1a, one method for translating to a relative time base is described as follows. First, the BTS 20 receives the periodic pulse at some time $t_0$ from the GPS receiver 24. It samples the air-interface state at $t_0$ and saves state variables $BN_0$, $TN_0$, and $FN_0$ representing the bit, timeslot, and frame, respectively. Subsequently, the BTS 20 receives an assistance message from its serving BSC 22 that contains a time-stamp $t_1$, as described previously. Given the state at $t_0$ and the difference $t_1-t_0$, the BTS 20 calculates the air-interface state at $t_1$, which consists of $FN_1$, $TN_1$, and $BN_1$. The absolute time, $t_1$, is thus represented in the air-interface timebase by parameters $FN_1$, $TN_1$, and optionally, $BN_1$. Using $FN_1$ and $TN_1$ provides timing accuracy of 0.56 ms; accuracy of 3.9 $\mu$s is achieved when $BN_1$ is also used.

While the above discussion has focused on GSM wireless networks, those skilled in the art will recognize that absolute time can be represented by the time base of other types of networks using both TDMA and code-division multiple-access (CDMA) techniques. For instance, ANSI-136 TDMA networks employ a frame/timeslot/bit structure that is quite similar to GSM. In CDMA networks, an implicit relationship may exist between one or more of the multiple-access codes and GPS time; if not, it is certainly possible to derive an explicit relationship using monitoring techniques such as shown in FIG. 1b. In either case, it is feasible to express the time parameter in the assistance message in terms of the phase of the appropriate multiple-access code in the network.

Once the BTS 20 has received the assistance message and has translated $t_1$ to the derived air-interface time base, it transmits this updated assistance message on a broadcast bearer. The total bandwidth required for the broadcast message depends on the number of visible satellites N, the number of range derivatives ("order" of the assistance), and the timing accuracy. Assuming four derivatives and bit-level timing accuracy, Table 2 below shows that the total bandwidth ranges from 213 bits (N=4) to 573 bits (N=12), with 393 bits (N=8) being typical. Since broadcast bandwidth is a relatively scarce resource in most cellular systems, minimizing the size of the required broadcast message is very important. The relatively compact form of the assistance message allows the network to broadcast it very frequently. By reducing the latency of assistance delivery, the overall time required to find the user's location is reduced. Alternatively, the assistance can be stored in the MLC 14 and provided on a demand basis over a point-to-point channel.

TABLE 2

| Parameter | Range | Bits | #Required |
|---|---|---|---|
| $\phi_{i,k}(t_1)$ | 0–20460 chips | 13 | N |
| $r'_{i,k}(t_1)$ | ±800 m/s | 10 | N |
| $r''_{i,k}(t_1)$ | −0.08–+0.16 m/s$^2$ | 7 | N |
| $r'''_{i,k}(t_1)$ | ±2.5 × 10$^{-5}$ m/s$^3$ | 7 | N |
| $r''''_{i,k}(t_1)$ | ±0.8 × 10$^{-8}$ m/s$^4$ | 3 | N |
| SatID | 0–31 | 5 | N |
| FN$_1$,TN$_1$,BN$_1$ | 0–FN, MAX−1, 0–7, 0–156 | 33 | 1 |
| | Total bits | | 33 + 45N |

Figure 3:
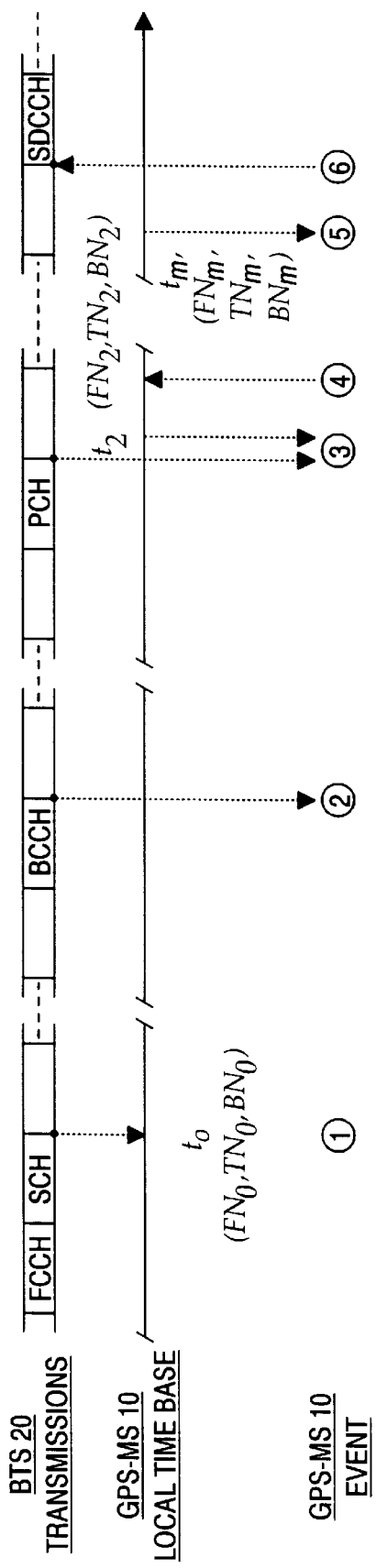
FIG. 3 is a timing diagram illustrating how the GPS-MS could operate in a derived time base.

The following describes how the GPS-MS 10 utilizes the assistance information broadcast by BTS 20 to acquire and make measurements on individual satellite signals in the composite received GPS signal. An important aspect of this invention is how the GPS-MS 10 operates solely in the network time base. FIG. 3 illustrates one method of how this could be done. The numbered items in FIG. 3 are described as follows:

1. Prior to making the measurements, the GPS-MS 10 must have been in IDLE mode receiving the GSM common channel for some period of time. During this process, the GPS-MS 10 locks frequency with the network 12 by receiving the Frequency Correction Channel (FCCH) and initializes its local time base to some time $t_0$ (FN$_0$, TN$_0$, BN$_0$) by observing the Synchronization Channel (SCH).

2. The GPS-MS 10 receives an assistance message over the Broadcast Control Channel (BCCH) which contains the time-of-assistance $t_1$ is represented by FN$_1$, TN$_1$, and possibly BN$_1$, as described above.

3. The GPS-MS 10 receives a measurement request message from the network 12. Alternately, the GPS-MS 10 initiates the measurement process, perhaps at the request of the user. The GPS-MS 10 determines its current time, $t_2$, in terms of the derived time base parameters FN$_2$, TN$_2$, and BN$_2$. With this information, the GPS-MS 10 performs the following computation to estimate the difference $\Delta t = t_2 - t_1$ in terms of the absolute (GPS) time base:

$\Delta FN = FN_2 - FN_1$;

if $\Delta FN < 0$, $\Delta FN = \Delta FN + (FN\_MAX + 1)$;

$\Delta TN = TN_2 - TN_1$;

if $\Delta TN < 0$, $\Delta FN = \Delta FN - 1$;

$\Delta TN = \Delta TN + 8$;

$\Delta t = \Delta TN \cdot \pi_T + \Delta FN \cdot \pi_F$;

where $\pi_T$ and $\pi_F$ are the duration of the GSM timeslot and frame, respectively. The GPS-MS 10 uses the calculated $\Delta t$ with the assistance information to predict the search parameters as described above. If the bit number BN$_1$ is provided in the assistance, it is also included in the calculation.

4. Until this point, the GPS-MS 10 has been frequency-locked to the network 12. If the GPS-MS 10 receiver is designed such that simultaneous GPS and network air-interface reception is not possible, then at this point it unlocks from the network and its internal oscillator free-runs. The GPS-MS's frequency accuracy will be on the order of 0.05-ppm (or better) just prior to unlocking, so the GPS-MS 10 will be able to free-run for at least several minutes without significant impact to the GPS measurements.

5. At this point, the GPS-MS 10 is prepared to begin acquiring and measuring the individual signals of the satellites indicated in the assistance visible list. There are many possible search strategies for acquiring these signals, and the following is one for which the assistance is particularly useful.

a. Compute an estimate of the frequency offset, $\overline{f}_1$, of the first signal by $$\overline{f}_1 = f_0 + \frac{1}{\lambda} \sum_{n=1}^{*} \frac{\tilde{r}^{(n)}_{1,k}}{(n-1)!} (\Delta t)^{n-1} \quad (7)$$

where $f_0$ is some expected or nominal offset due to the hardware implementation and the second term predicts the Doppler offset due to the satellite motion. The symbol * denotes the number of derivatives used/transmitted. The parameter $\lambda$ is the wavelength of the GPS signal (0.1903 m/cycle for the 1575.42-MHZ carrier) and "~" indicates values constructed from the quantized assistance parameters. Also, compute an estimate of the bit phase, $\overline{\phi}_1$, of the signal for the first satellite in the visible list by $$\overline{\phi}_1 = \left[ \tilde{\phi}_1 - \frac{1}{\lambda_{CA}} \sum_{n=1}^{*} \frac{\tilde{r}^{(n)}_{1,k}}{n!} (\Delta t)^n \right] \text{modulo}(20 \cdot 1023), \quad (8)$$

where $\lambda_{CA}$ is the wavelength of one chip of the GPS C/A code (293 m).

b. Search some portion of code for the first signal using the estimated offset $\overline{f}_1$ and bit-phase $\overline{\phi}_1$. The required search depends on the amount of time and location uncertainty as perceived by the GPS-MS 10. Depending on the expected accuracy of $\overline{f}_1$, may also be necessary to search at other frequencies near $\overline{f}_1$. Factors influencing the timing and frequency accuracy of the GPS-MS include the frequency accuracy of the BTS 20 transmitter, the time difference $\Delta t$, the GPS-MS position uncertainty (BTS cell size and/or timing advance of the cellular transmit of the user), and the resolution of timing parameter in the assistance message. The frequency offset estimate $\overline{f}_1$ is refined in this manner to a better estimate $\overline{f}_1^*$.

c. If necessary, after finding the phase of the 1023-chip code, perform bit synchronization to resolve the integer-millisecond ambiguity in the bit timing. This produces a refined bit-phase estimate $\overline{\phi}_1^*$. Bit synchronization is not necessary if the location-error and clock-bias terms in equation (4) are in total less than 0.5 ms, and in this case the bit-phase estimate can be derived directly from the code phase.

d. If the signal for the first satellite in the list cannot be acquired, then steps 1–3 are repeated for subsequent satellites in the assistance list until one is acquired. Otherwise, the receiver predicts the frequency offset and bit phase of the second satellite by the following relations $$\tilde{f}_2 = f_0 + (\tilde{f}_1^* - \tilde{f}_1) + \frac{1}{\lambda} \sum_{n=1}^{*} \frac{\tilde{r}_{2,k}^{(n)}}{(n-1)!} (\Delta t)^{n-1}$$

$$\tilde{\phi}_2 = \left[ \tilde{\phi}_2 + (\tilde{\phi}_1^* - \tilde{\phi}_1) + \frac{1}{\lambda_{CA}} \sum_{n=1}^{*} \frac{\tilde{r}_{2,k}^{(n)}}{n!} (\Delta t)^n \right] \bmod(20 \cdot 1023),$$

where "~" again represents the quantized assistance parameter and $\lambda_{CA}$ is the wavelength of the C/A code (293 m/chip for $f_{CA}$=1.023 MHZ). The value $\tilde{f}_2$ includes a better estimate of the offset due to the hardware, which is derived from the measurements on the first satellite. Likewise, the value $\tilde{\phi}_2$ includes a fractional-millisecond time bias derived from the first satellite.

e. Using these estimates, the receiver searches for the remaining satellites in the assistance visible list. The number of frequency offset hypotheses to be tested for each satellite depends on the reliability of the estimates $\tilde{f}_i$, but in general the search space is relatively small. One factor affecting reliability of $\tilde{f}_i$ is the Doppler shift due to motion of the GPS-MS 10, which is unknown and different for each satellite. If the GPS-MS 10 is stationary or moving at pedestrian speeds, then the Doppler is negligible and likely only a single offset hypothesis will be required. Higher speeds introduce more Doppler ambiguity and thus require either more hypotheses or shorter correlations. Doppler estimates may be available from the cellular receiver in the GPS-MS 10. Also, only a subset of the 1023-chip code space must be searched for each of the remaining satellites. The dominant remaining ambiguities are due to the GPS-MS location uncertainty and the prediction error in the satellite ranges (second and third terms in equation (4)). If the cell served by $BTS_k$ has radius less than 30 km, then the range uncertainty due to user location is bounded by $$\Delta \phi < \frac{2 \cdot (\hat{l}_i \cdot \Delta x)_{max}}{\lambda_{CA}} = \frac{2 \cdot (3 \cdot 10^4 m)}{\lambda_{CA}} = 206 \text{ chips.} \quad (10)$$

Note that the typical figure will be much less and thus the ambiguity is much less than the 1-ms code period. The uncertainty due to range prediction error depends on several factors, including the assistance quantization scheme and the time $\Delta t$ since the assistance was calculated.

f. After the receiver has acquired at least three satellites and made the respective measurements, the GPS-MS 10 performs the following:

i) Quantize the measured 1-ms code phase (0–1023 chips) for each visible satellite; for example, an 18-bit ($2^8$-level) quantization provides ~1/256-chip resolution of the measurements, which is ~1 m range resolution;

ii) Compute a quality indicator for each measurement; e.g., 4-bit quantization of the measurement SNR; and iii) Sample the GPS-MS's derived time-base at the time of the measurements. The measurement time, $t_m$, is encoded by $FN_m$ and $TN_m$ requiring 25 bits. This (9)

representation gives 0.56-ms resolution for the time of measurement.

The measured satellites also must be indicated. The example bit allocation in the return message described above is shown in Table 3 below. The number of bits ranges from 106 (N=3) to 349 (N=12).

TABLE 3

| Parameter | Range | Bits | #Required |
|---|---|---|---|
| $\theta_i$ | 0–1023 chips | 18 | N |
| $q_i$ | 0–15 | 4 | N |
| SatID | 0–31 | 5 | N |
| $FN_m$, $TN_m$ | 0–(FN_MAX–1), 0–7 | 25 | 1 |
| Total bits | | | 25 + 27N |

6. The GPS-MS 10 resynchronizes with the network transmissions (if necessary) and sends a measurement message such as shown in Table 3, above.

Once the serving BTS 20 receives the measurements from the GPS-MS 10, it transforms the time parameter $t_m$ to an absolute (GPS) time and forwards the measurements with this absolute time stamp to the MLC 14. The above discussion assumes that the network 12 initiates the GPS measurements, but the invention also anticipates the case in which the GPS-MS 10 initiates the measurements. In this case, the response from the network may include the assistance parameters for the GPS-MS 10.

The following describes how the MLC 14 computes the position solution after it receives the measurement results from the GPS-MS 10. In addition to the measurement results, the MLC 14 also has the following information necessary for computing the GPS-MS's position:

Absolute (GPS) time of the measurements, $t_m$;
Ephemeris for the GPS satellites;
Location of all served BTS; and
The maximum possible size (radius) of cells in the system it serves.

The solution method described here is a well-known technique that involves linearization of non-linear equations around a reference point. Other techniques will be obvious to those skilled in the art. When the MLC 14 receives a measurement response message from a GPS-MS 10 served by $BTS_k$, it performs the following steps when computing the GPS-MS position:

1. The MLC 14 estimates the positions $s^\wedge_i(t_m)$ of all GPS satellites included in the measurement message at $t_m$ using the ephemeris. This is a well-known computation and can be found in B. Parkinson and J. Spilker (eds.), *Global Positioning System: Theory and Applications* (Volumes I and II), AIAA Press, 1996, for example.

2. The MLC 14 computes the ranges $r_{i,k}(t_m)$ from $BTS_k$ to each of the satellites at $t_m$.
3. The MLC 14 computes a directional cosine matrix, H, for estimated line-of-sight to each measured satellite. The estimated line-of-sight vector in FIG. 2 is $\hat{s}_i(t_m) - x_k$. This matrix is given by $$H = \begin{bmatrix} \underline{d_1} & -1 \\ \underline{d_2} & -1 \\ \vdots & \vdots \\ \underline{d_n} & -1 \end{bmatrix} \cdot \underline{d_i} = (\hat{s}(t_m) - \underline{x}_k) r_{i,k}(t_m). \quad (11)$$

4. The MLC 14 corrects the code phase measurements 74 $_i$ by applying the satellite clock corrections, with rotational corrections, and, if available, differential GPS (DGPS) corrections. These corrected measurements are called $\theta_i'$. The DGPS corrections may be provided by a GPS receiver at a known location in the network, such as at one of the BTSs 20. Another possible source of DGPS is via FM sub-carrier, which is available on radio stations in many areas of the United States and Europe.
5. For each GPS satellite in the measurement message, the MLC 14 computes the range difference $\Delta \rho_i$ between the computed range $r_{i,k}(t_m)$ and the measurement made at time $t_m$ in the GPS-MS 10. Recall from the above discussion that the GPS-MS 10 measurements have one-millisecond modulus. The MLC 14 resolves the remaining ambiguity by using the fact that the distance between the GPS-MS 10 and $BTS_k$ ($|\Delta x|$ in FIG. 2) is less than the maximum cell radius, which is 30 km in a GSM system. In the worst case, only a 100-$\mu$s uncertainty remains. The output of this step is a column vector $\Delta \rho$ where the individual delta-ranges are in units of meters (m).
6. Given the vector $\Delta \rho$ of delta-ranges and the matrix H, the MLC 14 solves the following set of equations:

$$H \cdot \begin{bmatrix} \Delta x \\ c \cdot \Delta t \end{bmatrix} = \Delta \rho \quad (12)$$

where $\Delta x$ is the unknown vector displacement from the reference point $x_k$ (see FIG. 2) and $\Delta t$ is the unknown common time bias in the measurements. Several different methods exist for solving the above equation, including the well-known Weighted Least-Squares technique. In this method, a matrix Q is constructed from the measurement quality metrics $q_i$, and the unknowns are computed by $$\begin{bmatrix} \Delta x \\ c \cdot \Delta t \end{bmatrix} = (\underline{H}^T \underline{Q} \underline{H})^{-1} \underline{H}^T \underline{Q} \Delta \underline{\rho}. \quad (13)$$

Multiple iterations of this solution technique on the same set of measurements may be used and may be necessary to achieve convergence.

Figure 4A:
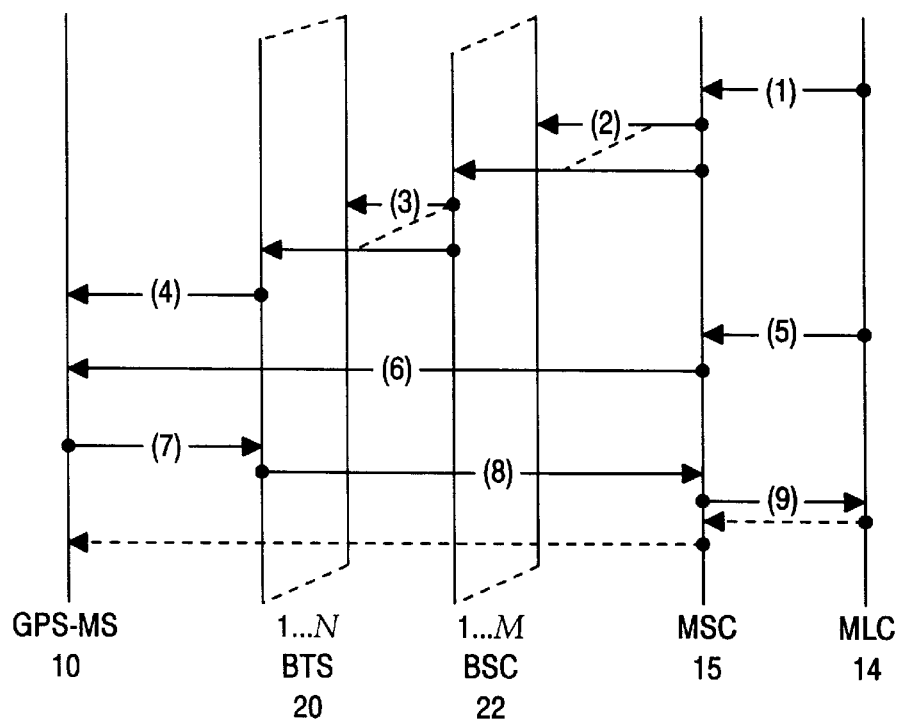
FIGS. 4a and 4b are message flow diagrams illustrating aiding the GPS receiver in accordance with the invention.

The above discussion relates to the positioning-related functions of the individual parts of the cellular or PCS system 12 aiding the GPS-MS 10. The following explains how they interact together in the form of a messaging protocol. An example of a protocol that is suitable for the synchronized network shown in FIG. 1a is shown in FIG. 4a. In this figure, vertical lines represent the units labeled below and time increases from the top to the bottom of the figure. Horizontal lines represent individual messages in the protocol, with dots and arrows indicating origin and destination node, respectively. The protocol in FIG. 4a is for a network in which one MLC 14 is associated with an MSC/VLR 15 that serves M BSCs 22, each of which serves N BTSs 20. A single GPS-MS 10 is of interest here, although there could be multiple GPS-MS in concurrent operation within the geographical area served by MLC 14. In FIG. 4a, GPS-MS 10 is served by $BTS_1$ 20, and both participate in the following protocol:

1) The MLC 14 computes a unique assistance for each BTS 20 in the MLC's serving area using valid GPS ephemeris and clock corrections, a database of BTS locations, and an accurate time reference.
2) The MSC/VLR 15 receives the assistance from the MLC 14, parses it into portions relevant to each BSC 22 that it serves, and sends the individual pieces to the respective BSCs.
3) Each BSC 22 receives the assistance message, parses it into individual messages for each BTS 20 that it serves, and sends the individual pieces to the respective BTSs.
4) When $BTS_1$ 20 receives a new assistance message, it translates the baseline time $t_1$ for the assistance from GPS time into network time base using its knowledge of both. $BTS_1$ replaces the previous assistance information and begins transmitting the new assistance on the BCCH or another broadcast channel transmitted by $BTS_1$. The assistance message is repeated periodically, with a period that is typically an integral number of superframes (240 ms in the GSM system). The assistance is now valid for up to 45 minutes and is available to all GPS-MS receiving that cell's BCCH, including GPS-MS 10 who receives and stores the assistance information. The duration of validity depends upon the number of derivatives in the assistance, and the repetition rate depends on balancing the traffic load on the BCCH with latency requirements for positioning the GPS-MS 10.
5) The MLC 14 sends a message to MSC/VLR 15 requesting that GPS-MS 10 shall be located using GPS measurements.
6) The MSC/VLR 15 identifies the location of GPS-MS 10 in the network, and sends a message via the appropriate BSC 22 and $BTS_1$ 20 instructing the GPS-MS 10 to begin GPS measurements. The GPS-MS receives the request and uses valid assistance data and the current time estimate $t_2$ to compute the Doppler and code-phase parameters that focus its acquisition process.
7) After GPS-MS 10 makes the measurements at time $t_m$, it constructs a response and sends it to $BTS_1$ 20 via the air interface.
8) $BTS_1$ 20 translates the measurement time $t_m$ from the network time base used in the GPS-MS to the GPS time base. These parameters are inserted into the measurement result message and it is sent to the serving MSC/VLR 15.
9) The MSC/VLR 15 forwards the result message to requesting MLC 14. This information is used by the MLC 14 along with the location of $BTS_1$ to compute the position of the GPS-MS 10. Optionally, the MLC responds to the GPS-MS via the MSC/VLR with the position information.

One possible variation is for the BSCs 22 to perform the time-base translation of the assistance message and the measurement responses from GPS-MS 10. In this case, the BSC 22 must have knowledge of the air-interface timing of all BTSs 20 that it serves, as well as timing information from a GPS receiver. This scheme may be preferable in some situations since fewer reference GPS receivers are necessary in the network.

Another possible variation is for the $BTS_1$ 20 to compute unique assistance data for mobiles in its region, translate the baseline time $t_1$ for the assistance from GPS time into network time base using its knowledge of both, and broadcast the message periodically or transmit the assistance data using a point to point messaging protocol. In this scheme, after the GPS-MS 10 makes measurements and sends it to the $BTS_1$ 20, the $BTS_1$ 20 can either compute the location of the GPS-MS 10 itself or optionally forward it to the MLC through the MSC/VLR, after translating the measurement time from the network time base used in the GPS-MS 10 to the GPS time base. In such a scheme, the $BTS_1$ 20 performs some or all of the tasks hitherto performed by the MLC since the $BTS_1$ 20 itself has access to a GPS receiver. It should be noted that while this is not the preferred embodiment, such variations are obvious to those skilled in the art and are included in the scope of this invention.

Another possible variation is for the translating entity to change the assistance time parameter $t_1$ to coincide with a specific event in network time. For instance, the BTS 20 may choose to align $t_1$ with the beginning of $FN_1$ such that $TN_1=BN_1=0$. If this is used as standard practice in the network, then the knowledge of the alignment can be implicit between BTS 20 and GPS-MS 10 and hence $TN_1$ and $BN_1$ do not need to be included in the assistance message. However, the translating entity must modify the bit phase $\phi_{i,k}(t_1)$ to account for the change in phase of the satellite transmissions between the original and new $t_1$.

Figure 4B:
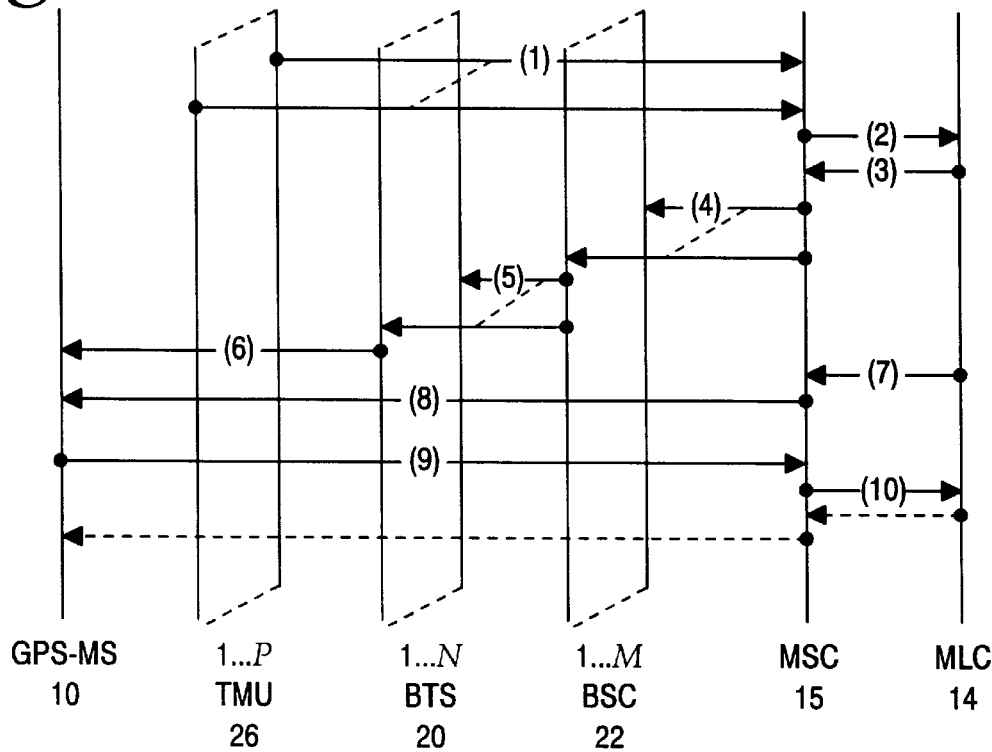

FIG. 4b demonstrates another possible set of messaging flows for this invention. This messaging protocol represents the case of an unsynchronized network, such as shown in FIG. 1b. In this case, the network contains TMUs 26 at known locations that capture timing of both GPS and the cellular network by observing transmissions of both systems. Each TMU 26 has an associated serving BTS 20, through which the TMU 26 reports its observations in the form of a timing relationship between GPS and the network transmissions. The messaging protocol shown in FIG. 4b is described as follows:

1. Each of the P TMUs 26 in the portion of the network served by MLC 14 report to the serving MSC/VLR 15 the timing relationships between GPS and the transmissions in the cells observed by the respective TMUs. This message may be sent unsolicited on a periodic basis by each TMU 26, or it may be sent as a response to the request by the MLC for this information.
2. The MSC/VLR 15 forwards the timing information message to the MLC 14. After successfully receiving this message, the MLC 14 has the capability for converting between the GPS and network time bases.
3. The MLC 14 computes a unique assistance for each BTS 20 in the MLC's serving area using valid GPS ephemeris and clock corrections, a database of BTS locations, and an accurate time reference. The MLC translates the reference time for the assistance into the network time base. The MLC sends to MSC/VLR 15 the assistance information for all cells served by the MSC/VLR.
4. The MSC/VLR 15 receives the assistance from the MLC 14, parses it into portions relevant to each BSC 22 that it serves, and sends the individual pieces to the respective BSCs.
5. Each BSC 22 receives the assistance message, parses it into individual messages for each BTS 20 that it serves, and sends the individual pieces to the respective BTSs.
6. When BTS 20 receives a new assistance message, it replaces the previous assistance information and begins transmitting the new assistance on the BCCH. The assistance is now available to all GPS-MS receiving that cell's BCCH, including GPS-MS 10 who receives and stores the assistance information.
7. The MLC 14 sends a message to MSC/VLR 15 requesting that GPS-MS 10 shall be located using GPS measurements.
8. The MSC/VLR 15 identifies the location of GPS-MS 10 in the network, and sends a message via the appropriate BSC 22 and BTS 20 instructing the GPS-MS 10 to begin GPS measurements.
9. After GPS-MS 10 makes the measurements at time $t_m$, it constructs a response and sends it to the MSC/VLR 15 via BTS 20 and BSC 22.
10. The MSC/VLR 15 forwards the result message to requesting MLC 14, which translates $t_m$ from the network time base to GPS time using the information captured from TMU 26. This information is used by the MLC 14 along with the measurements and the location of $BTS_1$ to compute the position of the GPS-MS 10. Optionally, the MLC responds to the GPS-MS via the MSC/VLR with the position information.

Those skilled in the art will immediately recognize that the assistance information also can be provided by point-to-point transmissions rather than broadcast as described above. The messaging protocols in FIGS. 4a and 4b are easily modified to accommodate point-to-point delivery by removing the messages used to distribute the broadcast information ((1)–(4) in FIG. 4a, (3)–(6) in FIG. 4b). Instead, the assistance information may be delivered with the position request ((5) in FIG. 4a, (7) in FIG. 4b) with the time field of the assistance being translated at the appropriate network node.

Thus, in accordance with the invention there is disclosed a system and method in which assistance information in the form of range of a fixed location in the wireless network and derivatives of the range are provided to a mobile station to assist a GPS receiver in the mobile station to make position measurements. This information can be used to measure code phases for satellites and return the measured code phases to the wireless network to compute location of the mobile station.

We claim:

1. The method of assisting a global positioning system (GPS) receiver to make positioning measurements, the GPS receiver being integrated in a mobile station including a transceiver operating in a wireless network, comprising the steps of:
   transferring assistance information from the wireless network to the mobile station, the assistance information representing range of a fixed location in the wireless network in proximity to the mobile station at a select time, and derivatives of the range, relative to plural select satellites in the GPS; and
   operating the mobile station to utilize received assistance information to search composite received signals from the plural select satellites in the GPS to measure a code phase for plural ones of the select satellites in the GPS, the measured code phases representing range of the mobile station relative to the plural ones of the select satellites.

2. The method of claim 1 wherein said select time is contained in the assistance information and is expressed to the mobile station in terms of a wireless network time.

3. The method of claim 2 wherein said wireless network utilizes time-division multiple access methods and said select time is represented by frame number, timeslot number, and bit number of network transmissions serving an area that is geographically proximate to the mobile station.

4. The method of claim 3 wherein the timeslot number, the bit number, or both, are implicitly known by both the wireless network and the mobile station and therefore are not transmitted.

5. The method of claim 2 wherein said wireless network utilizes code-division multiple access methods and said select time is represented by phase of a multiple access code of transmissions serving an area that is geographically proximate to the mobile station.

6. The method of claim 2 wherein the GPS satellites transmit navigation messages with 20-msec bit periods and wherein the transferring step includes the step of representing range as a bit phase observed at the fixed location at the select time.

7. The method of claim 6 wherein the select time is coincidental with a 20-msec. epoch of GPS time.

8. The method of claim 1 wherein the transferring step comprises the steps of calculating the assistance information, and quantizing and encoding the assistance information to be transferred via the wireless network to the mobile station.

9. The method of claim 2 wherein the mobile station is operated to utilize the information assistance to compute estimates of code phase and frequency offset of signals transmitted by the select satellites, and for each of the satellites uses these estimates to acquire the signal and measure a code phase for the particular satellite.

10. The method of determining location of a mobile station including a transceiver operating in a wireless network and a global positioning system (GPS) receiver, comprising the steps of:
   transferring assistance information from the wireless network to the mobile station, the assistance information representing range of a fixed location in the wireless network in proximity to the mobile station at a select time, and derivatives of the range, relative to plural select satellites in the GPS;
   operating the mobile station to utilize received assistance information to search composite received signals from the plural select satellites in the GPS to measure a code phase for plural ones of the select satellites in the GPS and returning the measured code phases to the wireless network; and
   computing location of the mobile station in the wireless network utilizing the fixed location and the measured code phases.

11. The method of claim 10 wherein said select time is contained in the assistance information and is expressed to the mobile station in terms of a wireless network time.

12. The method of claim 11 wherein said wireless network utilizes time-division multiple access methods and said select time is represented by a frame number, timeslot number, and bit number of a network transmissions serving an area that is geographically proximate to the mobile station.

13. The method of claim 12 wherein the timeslot number, the bit number, or both, are implicitly known by both the wireless network and the mobile station and therefore are not transmitted.

14. The method of claim 11 wherein said wireless network utilizes code-division multiple access methods and said select time is represented by a phase of the multiple access code of transmissions serving an area that is geographically proximate to the mobile station.

15. The method of claim 11 wherein the GPS satellites transmit navigation messages with 20-msec bit periods and wherein the transferring step includes the step of representing range as a bit phase observed at the fixed location at the select time.

16. The method of claim 15 wherein the select time is coincidental with a 20-msec. epoch of GPS time.

17. The method of claim 10 wherein the transferring step comprises the steps of calculating the assistance information, and quantizing and encoding the assistance information to be transferred via the wireless network to the mobile station.

18. The method of claim 11 wherein the mobile station is operated to utilize the assistance information to compute estimates of code phase and frequency offset of signals transmitted by the select satellites, and for each of the satellites uses these estimates to acquire the signal and measure a code phase for the particular satellite.

19. The method of claim 10 wherein the mobile station determines a measurement time representing when the code phase is measured for one of the select satellites and the measurement time is returned to the wireless network.

20. The method of claim 19 wherein the measurement time is represented relative to time of the wireless network and the computing step comprises transforming the measurement to an absolute GPS time.

21. The method of claim 10 wherein the wireless network comprises a mobile location center (MLC) and the MLC communicates with the mobile station via a base transceiver system (BTS) at the fixed location and the computing step is performed at the MLC.

22. The method of claim 21 wherein the MLC includes a GPS receiver and the transferring step comprises the MLC obtaining ephemeris information and computing the assistance information from the ephemeris information.

23. The method of claim 22 wherein the BTS includes a GPS receiver to provide an accurate time reference to relate time in the wireless network to GPS absolute time.

24. The method of claim 22 wherein the wireless network further comprises a time measuring unit (TMU) having a GPS receiver and a wireless transceiver monitoring the transmissions of a plurality of BTSs and the transferring step comprises transferring a time reference from the TMU to the MLC to relate time in the wireless network to GPS time.

25. A system for determining location of a mobile station, the mobile station including a transceiver operating in a wireless network and a global positioning system (GPS) receiver, comprising:
   a wireless network control system including GPS receivers for obtaining ephemeris data, the control system developing assistance information from the ephemeris data and transmitting the assistance information to the mobile station via the wireless network, the assistance information representing range of a fixed location in the wireless network in proximity to the mobile station at a select time, and derivatives of the range, relative to plural select satellites in the GPS;
   the mobile station including means utilizing received assistance information for searching composite received signals from the plural select satellites in the GPS to measure a code phase for plural ones of the select satellites in the GPS and returning the measured code phases to the wireless network control system via the wireless network; and
   the wireless network control system including means for computing location of the mobile station in the wireless network utilizing the fixed location and the measured code phases.

26. The system of claim 25 wherein said select time is contained in the assistance information and is expressed to the mobile station in terms of a wireless network time.

27. The system of claim 26 wherein said wireless network utilizes time-division multiple access methods and said select time is represented by frame number, timeslot number, and bit number of network transmissions serving an area that is geographically proximate to the mobile station.

28. Th system of claim 27 wherein the timeslot number, the bit number, or both, are implicitly known by both the wireless network and the mobile station and therefore are not transmitted.

29. The system of claim 26 wherein said wireless network utilizes code-division multiple access methods and said select time is represented by phase of a multiple access code of transmissions serving an area that is geographically proximate to the mobile station.

30. The system of claim 26 wherein the GPS satellites transmit navigation messages with 20-msec. bit periods and wherein the transferring step includes the step of representing range as a bit phase observed at the fixed location at the select time.

31. The system of claim 30 wherein the select time is coincidental with a 20-msec. epoch of GPS time.

32. The system of claim 25 wherein the network control system comprises means for calculating the assistance information, and quantizing and encoding the assistance information to be transferred via the wireless network to the mobile station.

33. The system of claim 26 wherein the mobile station is operated to utilize the assistance information to compute estimates of code phase and frequency offset of signals transmitted by the select satellites, and for each of the satellites uses these estimates to acquire the signal and measure a code phase for the particular satellite.

34. The system of claim 25 wherein the mobile station includes means for determining a measurement time representing when the code phase is measured for one of the select satellites and the measurement time is returned to the wireless network.

35. The system of claim 34 wherein the measurement time is represented relative to time of the wireless network and the computing means comprises means for transforming the measurement to an absolute GPS time.

36. The system of claim 25 wherein the wireless network comprises a mobile location center (MLC) and the MLC communicates with the mobile station via a base transceiver system (BTS) at the fixed location and the computing means is defined by the MLC.

37. The system of claim 36 wherein the MLC includes a GPS receiver and the MLC obtains ephemeris information and computes the assistance information from the ephemeris information.

38. The system of claim 37 wherein the BTS includes a GPS receiver to provide an accurate time reference to relate time in the wireless network to GPS absolute time.

39. The system of claim 36 wherein the wireless network further comprises a time measuring unit (TMU) having a GPS receiver and a wireless transceiver monitoring the BTS to provide an accurate time reference to relate time in the wireless network to GPS absolute time.

* * * * *